(No Model.)  
2 Sheets—Sheet 1.
H. H. WEYER.
BEEHIVE.
No. 516,340.  
Patented Mar. 13, 1894.
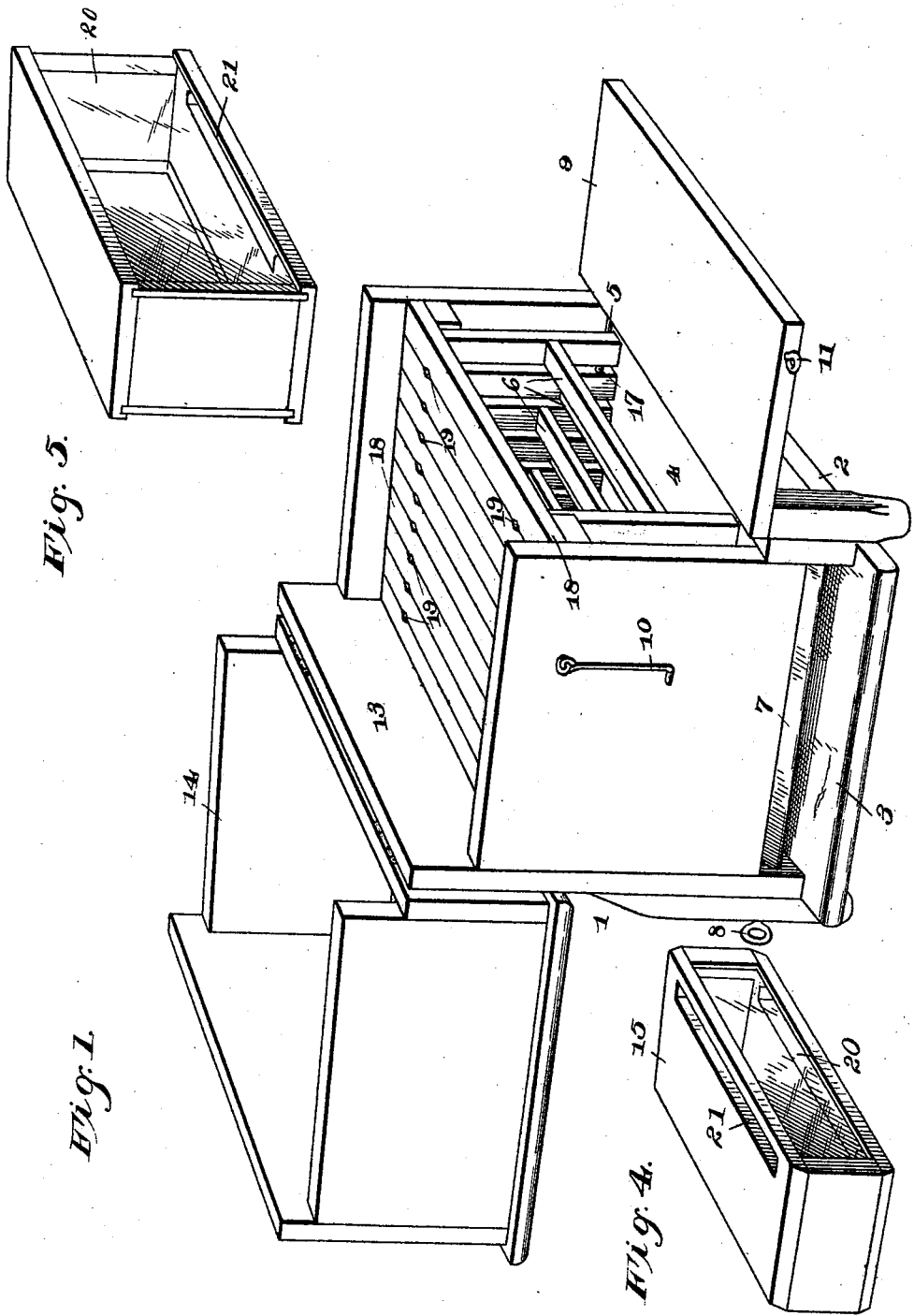
Witnesses  
C. A. Ford  
N. J. Riley
Inventor  
Henry H. Weyer,  
by C. A. Snow & Co.  
Attorneys (No Model.) 2 Sheets—Sheet 2.

H. H. WEYER.
BEEHIVE.

No. 516,340. Patented Mar. 13, 1894.

Witnesses
C. A. Ford
N. H. Riley

Inventor
Henry H. Weyer,
by C. A. Snow & Co
Attorneys

UNITED STATES PATENT OFFICE.

HENRY H. WEYER, OF BEDFORD, INDIANA.

BEEHIVE.

SPECIFICATION forming part of Letters Patent No. 516,340, dated March 13, 1894.

Application filed April 14, 1893. Serial No. 470,375. (No model.)

*To all whom it may concern:*

Be it known that I, HENRY H. WEYER, a citizen of the United States, residing at Bedford, in the county of Lawrence and State of Indiana, have invented certain new and useful Improvements in Beehives, of which the following is a specification.

The invention relates to improvements in bee hives.

The object of the present invention is to improve the construction of bee hives, to enable easy access to the interior to be had, to facilitate the removal of brood frames and honey sections, and to prevent effectually the entrance of moths.

The invention consists in the construction and novel combination and arrangement of parts hereinafter fully described, illustrated in the accompanying drawings and pointed out in the claims hereto appended.

Figure 3:
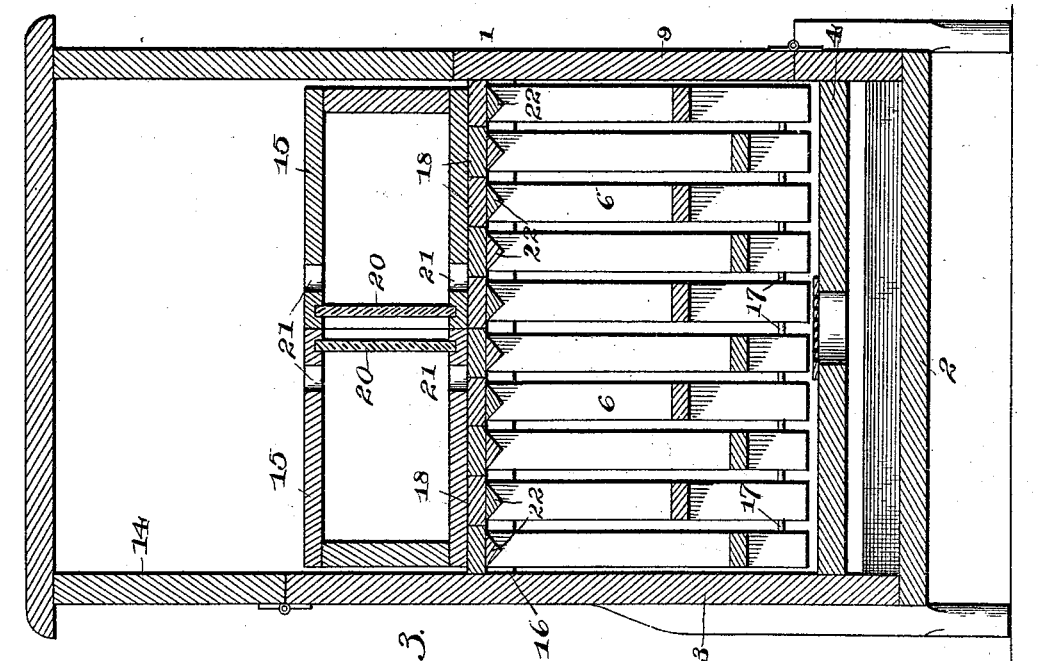
Figure 2:
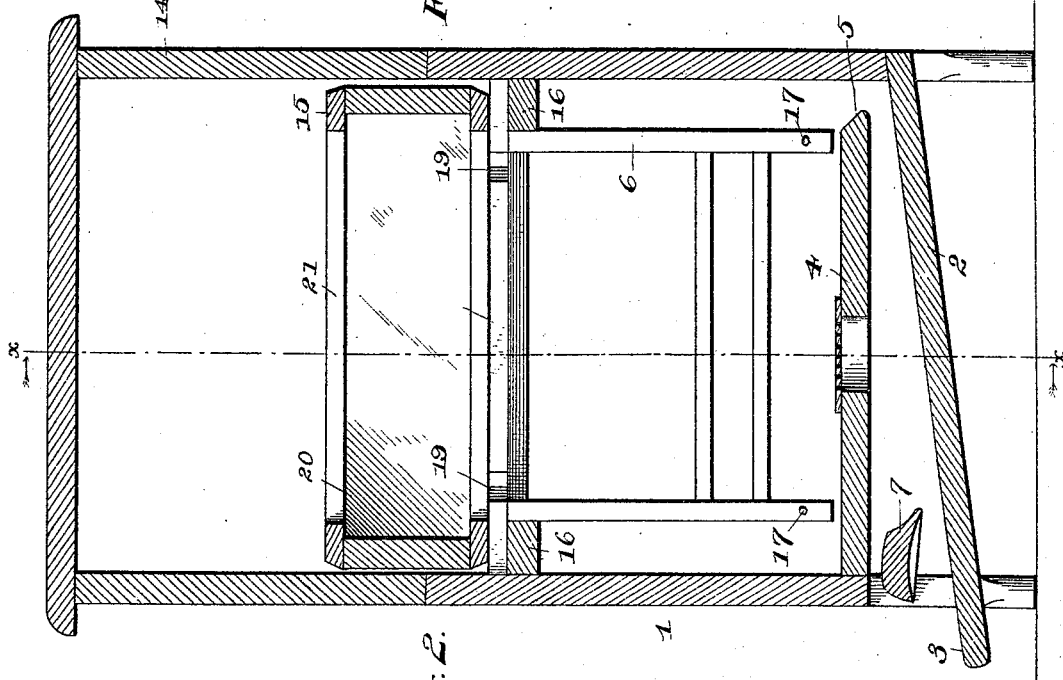

In the drawings—Figure 1 is a perspective view of a bee hive constructed in accordance with this invention, the hinged cover being swung back, the hinged side being lowered, and the honey sections being removed. Fig. 2 is a central vertical longitudinal sectional view. Fig. 3 is a vertical sectional view on line $x$—$x$ of Fig. 2. Fig. 4 is a detail perspective view of one of the honey sections. Fig. 5 is a perspective view of a modification of the honey sections.

Like numerals of reference indicate corresponding parts in all the figures of the drawings.

1 designates a rectangular hive body having a double bottom composed of a lower board 2, which is inclined and extended at the front of the hive to form an alighting board 3, and an upper board 4, which extends from the front of the hive to within a short distance of the back, and has its rear edge 5 beveled, whereby bees in entering the hive traverse the entire length of the same before finding access to the lower chamber containing brood frames 6. During the day, in summer, when the bees are at work, the space between the upper and lower boards of the double bottom is always filled with bees, and at this time it is impossible for a moth to gain entrance. At night the entrance is closed by a pivoted strip 7 of concavo-convex shape. The pivot strip is turned by a handle or thumb piece 8 and effectually excludes moths, and any attempting to enter the hive during the night may be readily cleaned off in the morning. The miller which lays the eggs that hatch the moth will endeavor to enter the hive and will crawl under the pivoted strip, which forms a trap and there deposit the eggs, which may be readily removed in the morning.

The side 9 of the body is hinged at the bottom, and is adapted to be lowered as illustrated in Fig. 1 of the accompanying drawings to afford access to the brood frames and it is secured when closed at each side edge by a hook 10 and an eye 11, which hooks and eyes are located at the front and back of the hive. The opposite side 13 of the body is extended vertically, and has hinged to it a cover 14, which when in position on the body forms an upper compartment or super for honey sections or boxes 15.

The brood frames are of the usual form, that is substantially rectangular, and are supported by cleats 16 secured to the front and back of the body. The brood frames are alternately large and small as shown, and are spaced at the bottom by projections 17. By employing the large and small brood frames and arranging them alternately as shown, they are prevented sticking together, and may be readily removed for any of the well known purposes, such as for supplying a scant colony. The adjacent edges of the top pieces 18 of the brood frames, are provided near their ends with notches 19 which form openings of a size to permit bees to pass into the upper compartment or super, but which exclude the queen bee. The honey sections may be provided with one or more transparent faces or sides 20, and are provided in the top and bottom with longitudinal slots 21.

In Fig. 5 of the accompanying drawings is illustrated a modification of the honey section, and this form is provided with opposite sliding transparent sides, and is provided in its bottom with a longitudinal slot. The upper board of the double bottom is provided with a ventilator opening over which is secured a sheet of gauze.

It will be seen that the hive is simple in its construction, that it is absolutely moth proof, and that access to the interior may readily be had.

Changes in the form, proportion and the minor details of construction may be resorted to without departing from the principle or sacrificing any of the advantages of this invention.

Each brood frame is provided on the lower face of its top piece with a triangular strip 22.

What I claim is—

1. A hive provided with a double bottom and consisting of a lower board extending entirely across the hive, and a rigid stationary upper board separated from the lower board by a space and extended from the front of the hive to within a short distance of the back, in combination with a concavo-convex strip 7 pivotally mounted in the space between the upper and lower boards of the bottom and provided with a thumb piece and adapted to be partially rotated to open and close the entrance of the hive, substantially as described.

2. In a hive, the combination of a body having a fixed side and a hinged side, cleats secured to the inner faces of the front and back of the body, brood frames supported by the cleats and provided at the adjacent edges of their top pieces with notches forming bee openings, honey sections arranged above the brood frames and having openings corresponding with those of the frames, and a cover hinged to the fixed side of the body and forming a super chamber, substantially as described.

In testimony that I claim the foregoing as my own I have hereto affixed my signature in the presence of two witnesses.

HENRY H. WEYER.

Witnesses:
FRANK WRIGHT,
GRANVILLE BAKER.